May 5, 1959
L. FROSTAD
2,884,789
POWER OPERATED ELLIPTICAL MOTION TOOL
Filed April 4, 1956
2 Sheets-Sheet 1
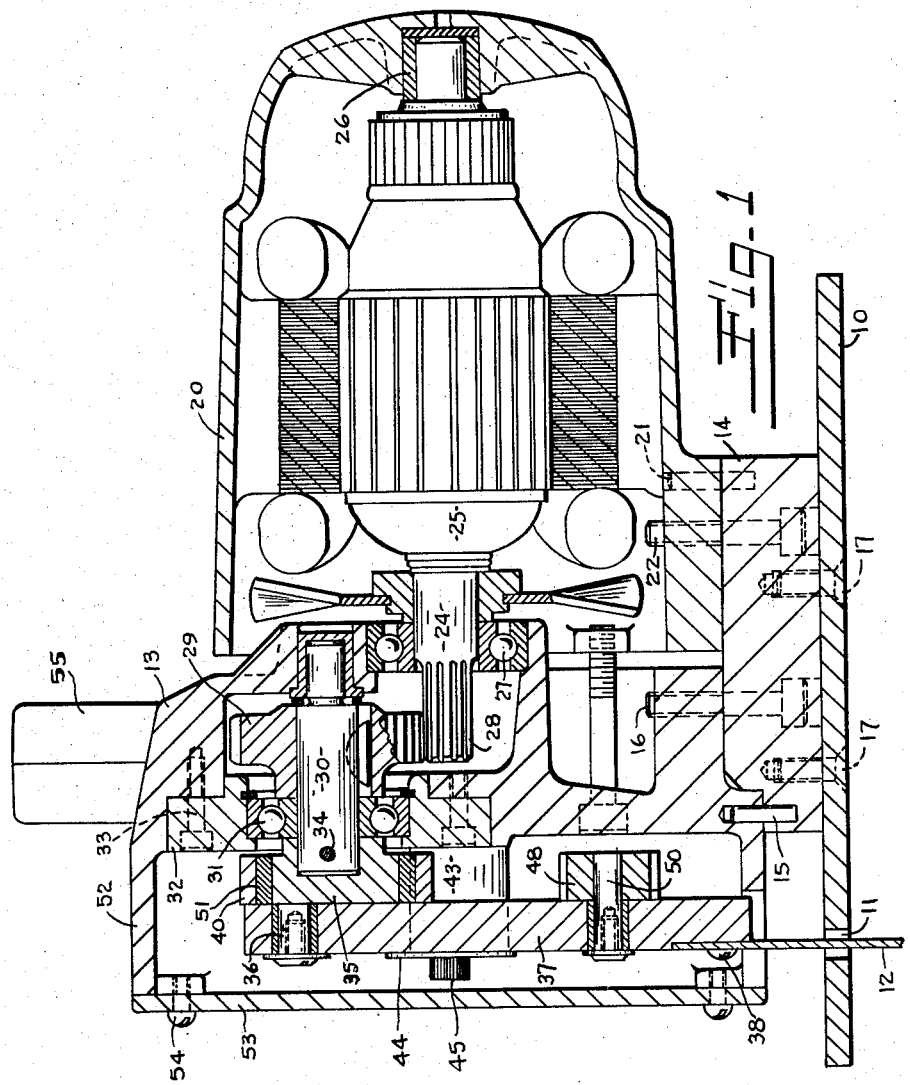
INVENTOR.
Lars Frostad
BY
*L. Emmett Thompson*
ATTORNEY.

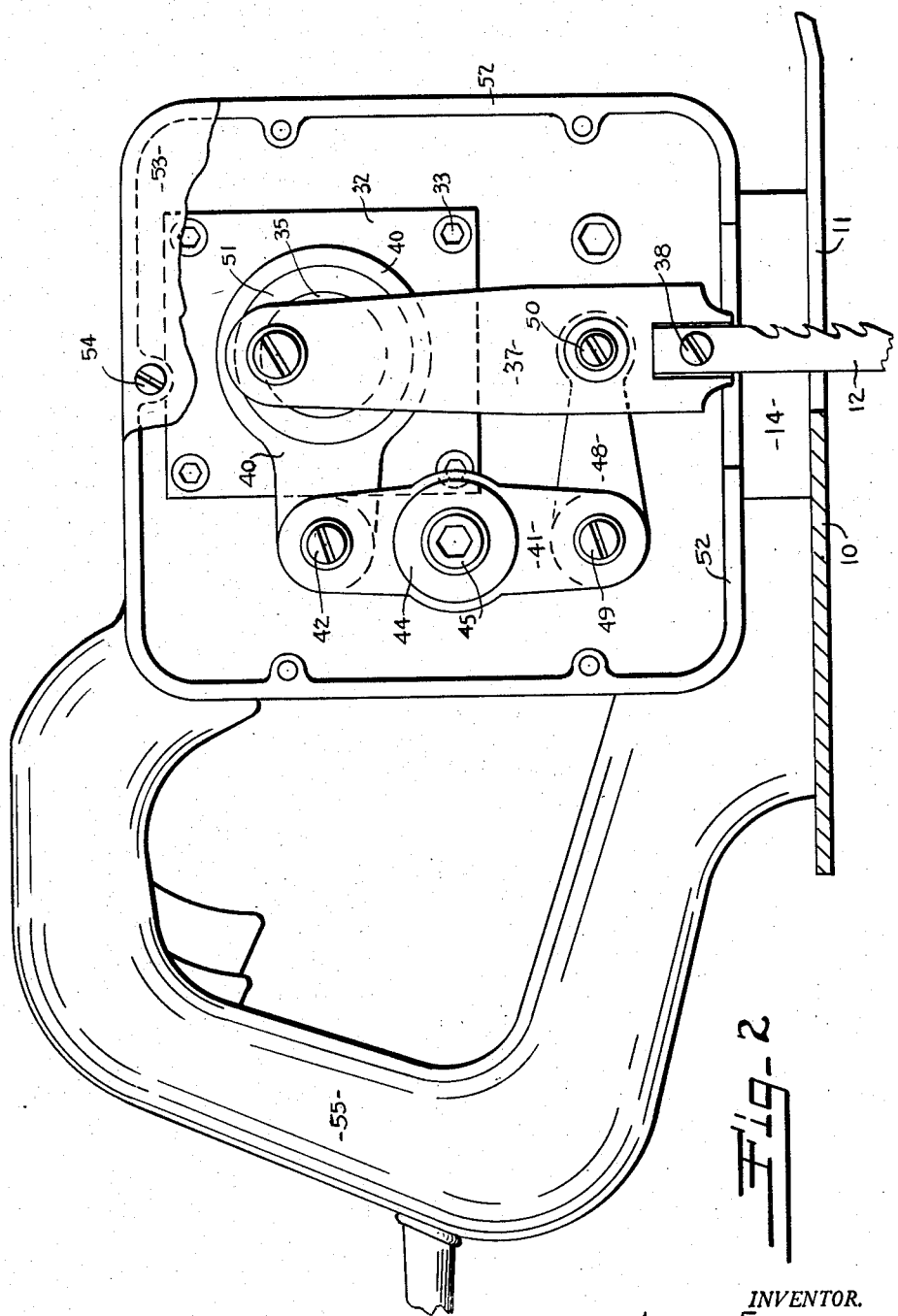

United States Patent Office 2,884,789
Patented May 5, 1959

2,884,789
POWER OPERATED ELLIPTICAL MOTION TOOL

Lars Frostad, Camillus, N.Y., assignor to The Porter-Cable Machine Company, Syracuse, N.Y., a corporation of New York Application April 4, 1956, Serial No. 576,199

2 Claims. (Cl. 74—43)

This invention relates to power operated elliptical motion tools, such as sawing machines, wherein the saw blade is reciprocated in a direction perpendicular to the surface of the work being cut, and simultaneously the blade is moved laterally, or perpendicular, to its reciprocatory movement whereby the teeth of the blade are moved into the work upon the cutting stroke and moved away from the work on the return stroke. A sawing machine of this type is disclosed in Patent No. 2,737,984, issued March 13, 1956, to John P. Bruck.

This invention has as an object a compact mechanism for effecting the orbital movement of the saw blade, or other tool, the mechanism embodying a structural arrangement which is particularly economical to manufacture, is capable of operating at high speeds, and which provides an effective support for the saw blade.

The invention consists in the novel features and in the combinations and constructions hereinafter set forth and claimed.

In describing this invention, reference is had to the accompanying drawings in which like characters designate corresponding parts in all the views.

Figure 1 is a lengthwise sectional view of a portable hand manipulated sawing machine embodying my invention.

Figure 2 is an end elevational view looking to the right, Figure 1, with the end plate of the housing removed.

The saw is mounted on a base plate 10 formed with a slot 11 extending rearwardly from the forward edge thereof, and in which the saw blade 12 is positioned for reciprocation. A casing 13 is mounted on a supporting block 14 and is secured thereto by dowels 15 and screws 16. The block, in turn, is secured to the base plate 10, as by screws 17. A motor housing 20 is also mounted on the block 14, as by dowels 21 and screws 22. The shaft 24, of the motor armature 25, is journalled at its outer end in a bearing 26 mounted in the outer end wall of the housing 20, and at its inner end the shaft is journalled in an antifriction bearing 27 mounted in the casing 13. The end of the shaft 24 is formed with a pinion 28 engaging a gear 29 fixed to a shaft 30 journalled in the casing 13, the outer end of the shaft being supported by an antifriction bearing 31 mounted in a cap member 32 secured to the casing 13 by screws 33. The outer end of the shaft has affixed to it, as by pin 34, an eccentric 35 and this eccentric member 35 has an outwardly projecting crank pin 36.

A tool carrier 37 is connected at one end to the crank pin 36 and depends substantially radially from the shaft 30, and has the saw blade 12 affixed to its lower end, the saw blade being positioned in a recess and secured to the holder, as by screw 38. A link 40 is mounted upon the eccentric 35, and is pivotally connected at its free end, to one end of a link 41, as by pivot screw 42. The link 41 is pivotally mounted, intermediate its ends, on a boss 43 formed integral with the casing 13, the link being retained by a washer 44 and screw 45. A link 48 is pivotally connected, at one end, to the lower end of the link 41, as by pivot screw 49. The opposite end of the link 48 is pivotally connected to the tool carrier 37, as by pin 50.

The function of the crank pin 36 is to effect vertical reciprocation of the tool holder 37. The function of the link 40 and the eccentric 35 on which it is mounted, is to effect oscillation of the link 41 about its pivot support 43, and through the link 48, to effect lateral movement of the tool carrier 37. The arrangement of this linkage and the relative relation between the eccentric 35 and the crank pin 36 is such as to move the tool carrier and the saw blade 12 carried thereby forwardly upon upward movement of the blade, and to effect rearward movement of the blade away from the work piece upon downward movement of the carrier 37 by the crank pin 36.

The eccentric strap 40 is preferably provided with a bushing 51 of antifriction material, and like bushings are employed on the pivotal connections of the linkage. The casing 13 is formed with a laterally extending flange 52 which, in conjunction with plate 53 attached thereto by screws 54, forms an enclosure for the linkage and tool carrier 37. A suitable handle 55 is attached to the block 14 and to the upper portion of the casing 13, the handle 55 serving as a convenient means for guiding the saw along the work piece.

What I claim is:

1. A power operated elliptical motion tool comprising a casing, a motor mounted in the casing, an actuating shaft journalled in said casing and being operatively connected to said motor, said shaft being provided with a crank pin, a tool carrier apertured at one end to receive said crank pin for reciprocation thereby upon rotation of said shaft, said carrier being disposed radially of said shaft, a lever extending in parallel spaced relation to said tool carrier and being pivotally mounted intermediate its ends on a fixed support, a link pivotally connected at one end to one end of said lever and being pivotally connected at its opposite end to said tool carrier at a point intermediate said crank pin and the opposite end of said carrier, and means operable by said shaft and cooperable with the opposite end of said lever to effect oscillation thereof about said fixed pivot in timed relation to the reciprocation of said tool carrier, and said crank and link comprising the sole support for said tool carrier.

2. A power operated elliptical motion type tool comprising a casing, a motor mounted in said casing, an actuating shaft journalled for rotation in said casing and being operatively connected to said motor, an eccentric fixed to said shaft, a crank pin carried by said shaft in juxtaposition to said eccentric, a tool carrier apertured at one end for connection to said crank pin for reciprocation thereby upon rotation of said shaft, said tool carrier being disposed substantially radially of said shaft and a tool affixed to the opposite end of said carrier, a link mounted on said eccentric and extending radially from said shaft in a direction substantially perpendicular to said tool carrier, a lever pivotally mounted intermediate its ends on a fixed support and extending in parallel spaced relation to said tool carrier, one end of said lever being pivotally connected to the free end of said link, a second link connected at one end to said tool carrier at a point intermediate said crank pin and said tool, said second link being connected at its opposite end to the opposite end of said lever, whereby said carrier is supported for orbital movement by said crank pin and said second link.

References Cited in the file of this patent

UNITED STATES PATENTS

| Re. 6,185 | Ehlers | Dec. 22, 1874 |
| 264,473 | Nixon | Sept. 19, 1882 |
| 2,619,133 | Vulliet-Durand | Nov. 25, 1952 |
| 2,723,688 | Conover | Nov. 15, 1955 |
| 2,796,768 | Stoll | June 25, 1957 |